United States Patent [19]

McDonald

[11] 4,037,063
[45] July 19, 1977

[54] MICROPHONE HOLDER ASSEMBLY

[76] Inventor: Gregory McDonald, 21 Columbus Ave., Hillsdale, N.J. 07642

[21] Appl. No.: 737,943

[22] Filed: Nov. 2, 1976

[51] Int. Cl.² .............................................. H04M 1/04
[52] U.S. Cl. .................................... 179/147; 179/178
[58] Field of Search ................................ 179/147, 178

[56] References Cited

U.S. PATENT DOCUMENTS 1,548,817    8/1925    Baer ..................................... 179/147

Primary Examiner—William C. Cooper
Attorney, Agent, or Firm—Leo C. Krazinski

[57] ABSTRACT

There is disclosed a microphone holder assembly which is designed to have a C.B. radio microphone or the like placed therein, which microphone can be operated by an appropriate linkage arrangement which can be manually operated by the user. The design of the holder is such that with minor modifications, various microphone designs can be accommodated. Means are provided for locking the linkage arrangement used to activate the microphone switch. The locking means frictionally engage the activating linkage and include spring means which store up energy when the activating linkage is located in the operating mode and release that energy when the locking means is disengaged from the activating linkage, returning the locking means to its at-rest position.

8 Claims, 6 Drawing Figures

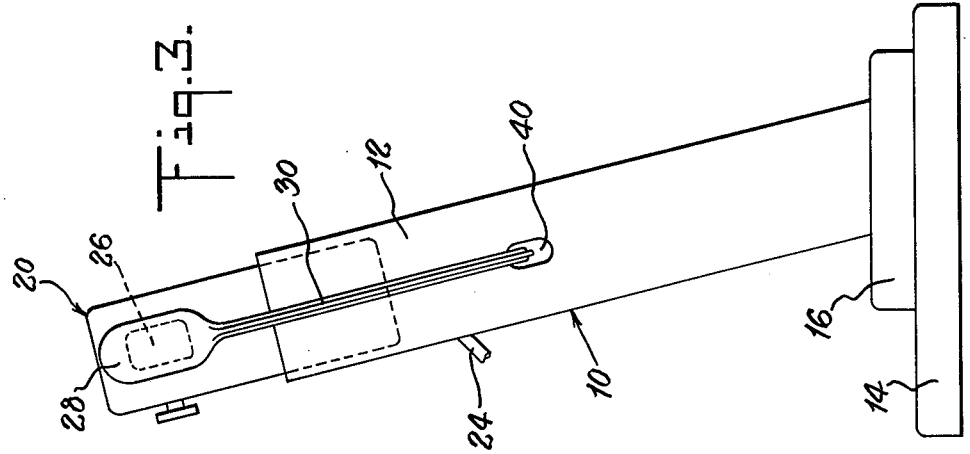
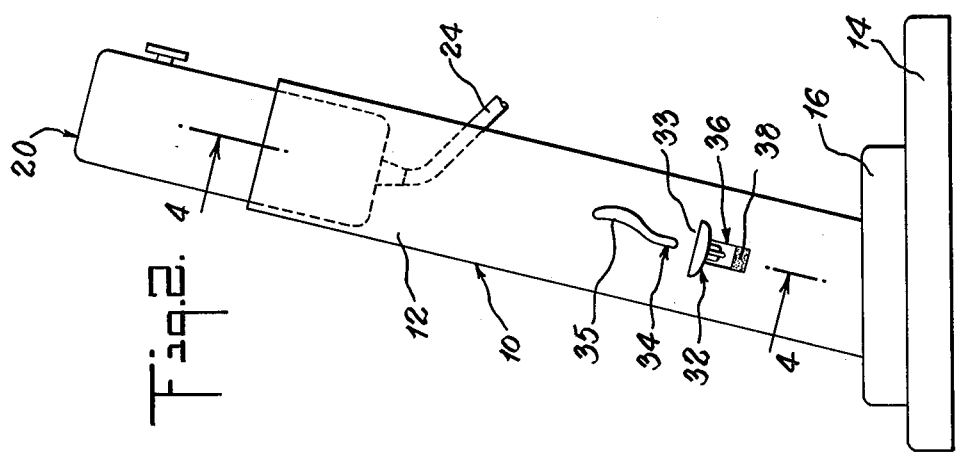
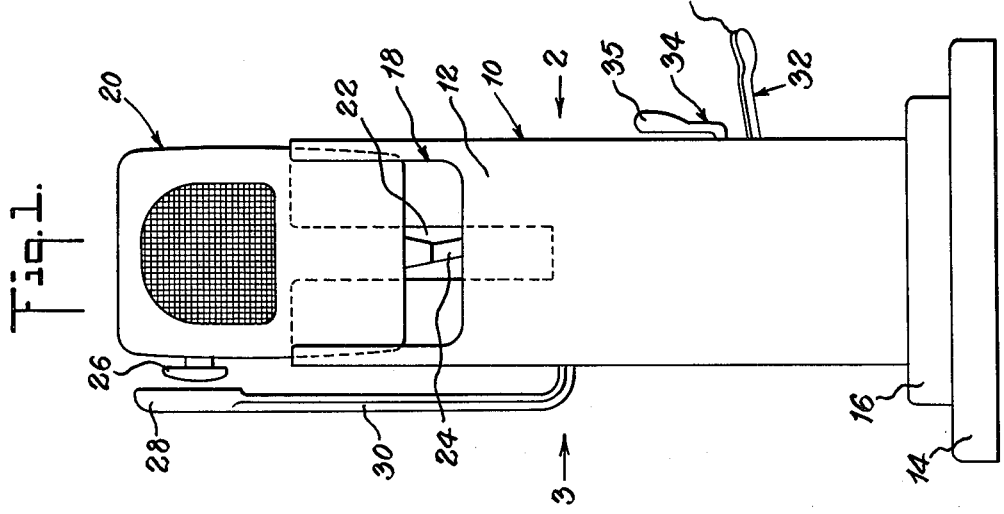

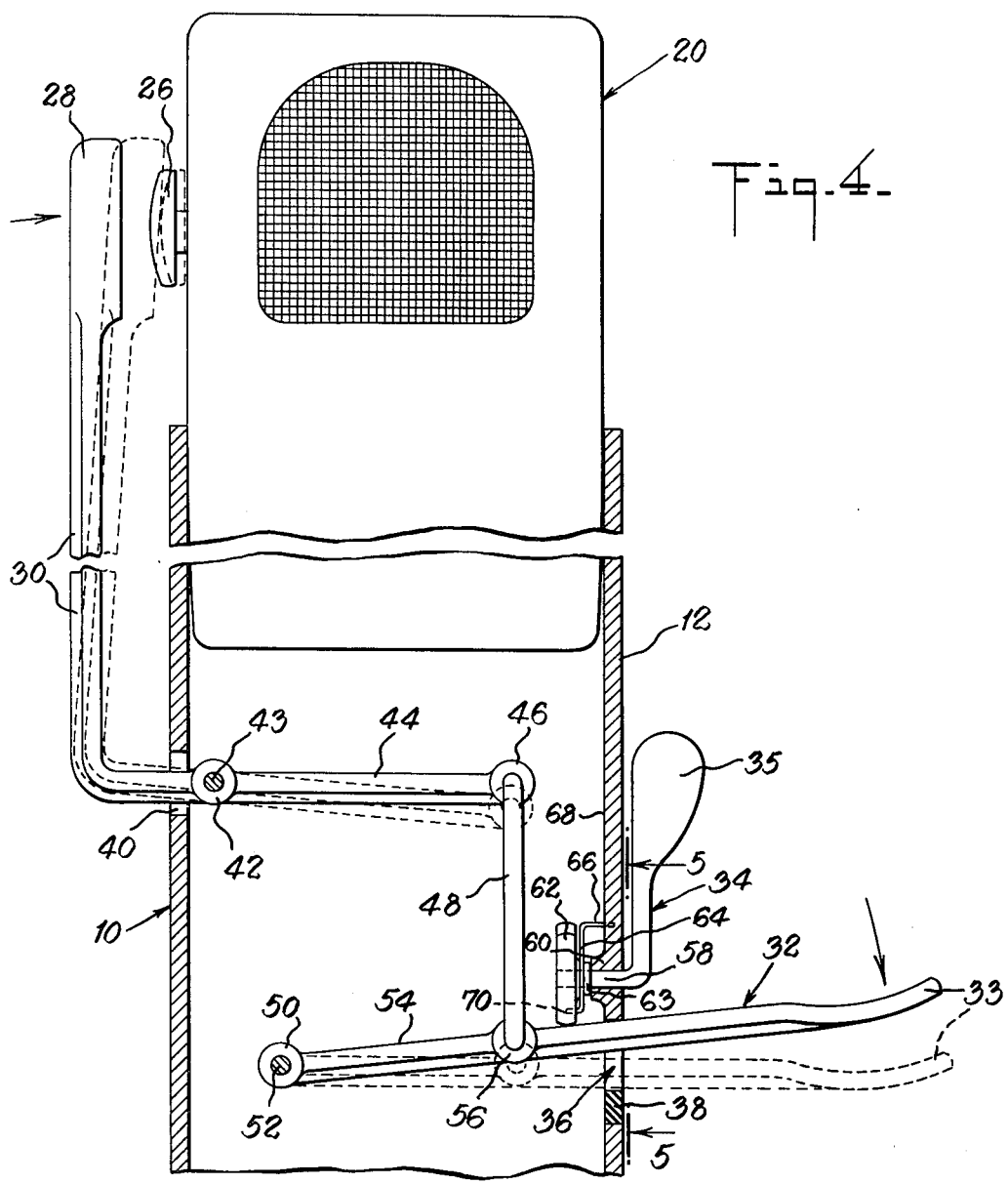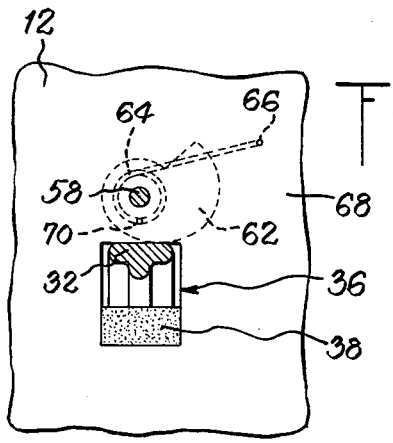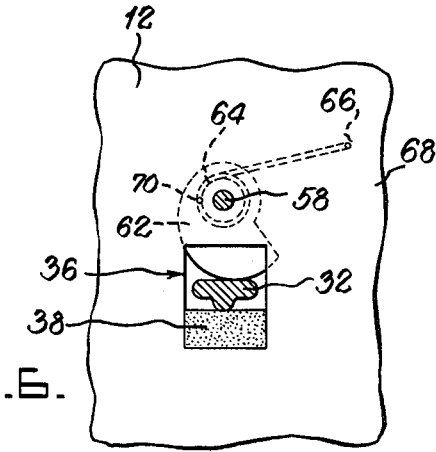

MICROPHONE HOLDER ASSEMBLY

BACKGROUND OF THE INVENTION

This invention relates to a holder for microphones and particularly a holder which has incorporated therein means for activating the microphone while in position thereon.

With recent developments in solid state electronics, many items of basically a radio nature, such as short-wave sets, recorders, and most recently citizen's band radios, have become light weight and thus portable and comparatively inexpensive to purchase. The country is experiencing a boom in the purchase of these instruments.

A typical unit includes a main console housing the receiver and transmitting circuits and the various supportive electronics. It further includes a suitable microphone for voice recording or transmission which is attached to the console by a flexible cord.

These microphones are usually contoured to fit into the operator's hand. They include an activating switch which is easily worked by the fingers of the hand holding the microphone. This switch is wired to the circuitry contained in the main assembly to allow the operator to transmit a message via his unit to another party.

In many circumstances, it would be desirable to free-up the operator's hand during his transition mode, in order that he might use it for some other purpose. For example, with a C.B. unit mounted in a car, the fact that the operator would otherwise have one hand holding the steering wheel and one hand on the microphone unit creates a safety problem which quite obviously could have dire consequences. Also, when the unit is removed from the vehicle and placed in the home, or where the unit is always in the home, it would be desirable to provide a means whereby the microphone could be activated during the talk mode and at the same time free the operator's hand to allow him to do other tasks simultaneously.

It is therefore a primary object of this invention to provide a holder assembly which includes means for activating the microphone to thereby enable the operator to use his hands simultaneously with his transmission.

It is another object of this invention to provide a holding apparatus which includes means for quickly releasing the switch activating means, to thereby allow reception of the voice transmission of another.

Summary of the Invention

Towards the accomplishment of these and other objects and advantages which will become apparent from the following description, there is disclosed a holder for a C.B. microphone or the like which includes an upright portion mounted on a pedestal arrangement for standing the holder on a table top. The upright portion includes a suitably contoured cutout section which is designed to accomodate a particular microphone design. This cut-out section can be modified to handle the various type microphone designs on the market. Activating lever means are pivotally connected to the upright portion which activating means coact with the microphone switch after pivoting in response to the physical urging of the operator to thereby turn the microphone switch on thus allowing voice transmission. The upright portion can be inclined from the vertical in such a way that the microphone is in line with the operator's voice as he sits in a normal manner.

Means for locking the activating lever means are provided, which locking means are rotatively mounted in the upright portion of the holder. The locking means in a preferred embodiment comprises an eccentric cam secured to one end of a right angled lever which would be depressed by the operator when desired to activate tha locking arrangement. The locking means further includes a spring arrangement which has one end thereof secured to the housing of the microphone holder and the other end secured to the cam such that when the locking lever is rotated, energy is stored up in the spring. The locking means further includes a resilient member positioned beneath the activating lever, which resilient member urges the activating lever against the eccentric cam in order to maintain a frictional engagement between the two when they are in locked arrangement. When the operator depresses the activating lever against the resilient member to free the lever from its engagement with the locking means, the energy stored in the spring means returns the locking lever to its at-rest position, enabling the activating lever, likewise to be restored to its at-rest position.

BRIEF DESCRIPTION OF THE DRAWINGS

In addition to the above, additional objects and advantages will be apparent from the following description and accompanying drawings in which:

FIG. 1 is a front elevational view of the assembly with microphone in place.

FIG. 2 is a side elevational view of the assembly of FIG. 1 looking in the direction of arrow 2.

FIG. 3 is a side elevational view of the assembly of FIG. 1 looking in the direction of arrow 3.

FIG. 4 is an enlarged, partial, sectional view taken along lines 4—4 of FIG. 2.

FIG. 5 is a sectional view taken along lines 5—5 of FIG. 4.

FIG. 6 is a view similar to FIG. 5 both showing the cam in a locking position.

DESCRIPTION OF THE PREFERRED EMBODIMENT

The upstanding main portion 12 of the holder 10 is affixed to a pedestal arrangement, including portions 14 and 16, for standing the assembly on a table top or the like. The portion 12, as best seen from FIG. 4, is hollow in part and typically might be constructed as a two piece section to facilitate the assembly of the linkages (discussed hereinafter) associated with the operational aspects of the invention.

Portion 12 includes a cutout section 18 which is contoured to accept a particular style microphone 20. The cutout 18 includes a slotted portion 22 which is designed to allow the microphone cable 24 to exit from the holder assembly and to run to the main console of the radio receiver, tape recorder, etc. The shaper of the cutout 18 and the location of the slotted portion 22 do of course, depend on the particular style microphone employed.

The particular microphone depicted in FIG. 1 includes an operational switch 26 which, as illustrated, protrudes from the side of the microphone. In hand-held situations, this switch would be manipulated by the operator using his fingers. When the microphone is placed in the cutout 18, the switch 26 is positioned opposite a contact pad 28 which is an extension of activating arm 30. The pad 28 is of a shape such that it envelops the switch or rather the profile of switch 26 (as best seen in FIG. 3) so that in operation, sufficient interface contact is available between the two to guarantee activation of the switch.

An activating lever 32 protrudes outwardly from portion 12 of the holder. It includes an end portion 33 which is contoured to accommodate a digit of the operator's hand to facilitate its utilization.

Additionally, a locking lever 34 protrudes from the portion 12 and likewise includes a contoured end portion 35 which facilitates the operator's use thereof.

FIG. 2 illustrates that the upstanding portion 12 is inclined to the vertical so that the microphone when in position on the holder is orientated such that the operator can speak directly into it from a sitting position, without having to crouch over or otherwise assume an awkward position. Positioned in the cutout 36 through which the activating lever 32 passes is a resilient pad 38 made of foam rubber or the like.

FIG. 3 shows a clearance hole 40 through which the activating arm 30 passes into the inside of portion 12 of the holder. Contact pad 28 is seen to envelop the microphone switch, 26, shown dotted in this figure. Of course, the shape of the contact pad 28 generally would be determined by the pad outline of the switch for a given microphone.

Referring now to FIG. 4, there is shown in an expanded view of the holder with microphone in place, the internal linkages between the activating arm 30 and the activating lever 32. The arm 30 is shown to be a right angled structure which includes a boss 42 which has a thru hole drilled therein. The arm 30 is pivotally connected to the interior of portion 12 for example by press fitting the hole in boss 42 onto a protrusion 43 on the interior of portion 12, which protrusion if the holder were fabricated from plastic might be part of the mold for the unit. Extending further inward into the housing, activating arm 30 includes a straight link portion 44 connected to boss 42 and including at its terminal point a second boss 46 which is likewise drilled through to accept one hooked end of linking arm 48.

Activating lever 32 includes a boss 50 which is drilled through and then press fitted onto protrusion 52 which would likewise be formed or molded as part of the interior of the portion 12 of the holder. The arm or lever 32 extends from the pivot point formed by the protrusion 52 for a length 54 at which point there is included an additional boss 56 which is drilled through to accept the other end of linking arm 48. From that point, lever 32 extends outward and through cutout 36 terminating in the contoured end portion 33.

Locking lever 34 is a right angled piece which includes a segment 58 which passes through an embossed pad 60 which likewise would be molded to the inside sidewall of portion 12 of the holder. Segment 58 would be press fitted into a cam 62 which could be metal or even fabricated from plastic or like material. Interposed between the cam 62 and the innermost surface of pad 60 would be a washer 63 and coil spring assembly 64. Spring assembly 64 would include an end portion 66 bent at substantially right angles to the plane of the spring and inserted into an appropriately positioned hole on the inside wall 68 of the housing 12. The other end of the spring 64 would likewise be bent at right angles to the plane of the spring and would be seated in an appropriate niche 70 in the cam 62.

The resilient pad 38 is positioned in the lower portion of the cutout 36 and would be glued or otherwise secured thereto.

FIG. 4 shows in full line and dotted position of the previously described parts and linkages in both the standby and activated modes, respectively. In the use mode, the operator would depress activating lever 32 by pushing down typically at point 33. Linking arm 48 secured to activating lever 32 at boss 56, would likewise move down and in turn move straight linkage portion 44 of arm 30 downward. The portion of activating arm 30 outboard of the pivoting protrusion 43 consequently, would move upward which would result in the contact pad 28 moving inward towards the microphone switch 26 and activating it. By holding the lever 32 down, the operator can actuate the microphone and release it at the time his transmission ceases. When released, the spring action associated with the switch 26 causes it to move outward forcing the contact pad 28 away from it. The movement previously described is reversed with the activating lever 32 again moving upward to the at-rest position.

If it is expected that the transmission by the operator will take a period of time, he would activate th locking device of the invention in order to free his hand thus enabling him to do other things if so desired while simultaneously transmitting. In this circumstance, the operator pushes down lever arm 32 as described above but, additionally, he also depresses the locking lever 34 by applying finger pressure to contoured portion 35. From FIG. 5 it is seen that when in the at-rest position, that is with the spring restored to its normal position, cam 62 is orientated such that the distance between the pivoting point of the cam 62 and the outer perimeter thereof at the point of contact with the lever arm 32 is such that there is no pressure exerted by the cam on the lever arm at that point. When the locking lever 34 is activated, the cam moves in a clockwise direction as viewed in FIG. 5. The distance from the pivot 58 to the outer edge of the cam increases with increasing rotational movement such as to force the activating lever 32 downward. A point on the perimeter of the cam is reached where the distance between pivot 58 and the perimeter is such that the underside of the arm 32 is forced into the resilient pad 38. The pad offers sufficient resistance to this downward movement to thus provide enough friction between the mating surface of the cam and lever 32 as to insure that the cam cannot return to its at-rest position.

When lever 32 is depressed, since spring 64 has one end secured to the housing and one end secured to the cam in niche 70, as the cam rotates and niche 70 likewise rotates, there is introduced a certain amount of stored energy into the spring.

When again, it is desired to end the transmission, the operator depresses activating lever 32 further into the resilient material 38. The latter gives sufficiently to release the friction hold on the cam 62 and the energy stored in the coil spring forces the cam back to its at-rest position. Lever arm 32 likewise returns to that position in accordance with description set forth above.

Of course, other variations to the embodiment described will be readily apparent to those skilled in the art. As noted earlier, the cutout, 18, can be modified to accommodate most types of microphones that might possibly be used. Further, the linkage arrangement and the relative shape and position of the activating arm 30 and pad 28 can likewise be arranged and designed to accommodate a particular microphone design. Therefore, the breadth of the present invention should not be restricted by the description set forth above but determined by the scope of the claims which follow.

What is claimed is:

1. A holder for a microphone which comprises:
   a. an upright portion, said upright portion having a cutout section at the top thereof, said cutout section shaped to accommodate the dimensions of said microphone and to hold the microphone therein; and
   b. activating lever means pivotally connected to said upright portion, said activating means coacting with a switch on said microphone after pivoting in response to the physical urging of the operator to thereby turn the switch on, and thus allow voice transmission via the microphone.

2. The holder of claim 1 further comprising a pedestal portion fixedly secured to the bottom of said upright portion for standing said holder on a table.

3. The holder of claim 1 wherein said upright portion is inclined from the vertical such that the microphone is angled towards the voice of the operator.

4. The holder of claim 1 further comprising means for locking, said means for locking rotatably mounted in said upright portion, said means for locking having a first position wherein said activating lever means is engaged thereby and held in the position wherein the microphone is switched on, said locking means having a second position where it is disengaged from said activating lever means.

5. The holder of claim 4 further comprising:
   a. means for disengaging said locking means from engagement with said activating lever means in said first position; and
   b. spring means for rotating said locking means to said second position upon disengagement from said activating lever means.

6. The holder of claim 5 wherein said means for disengaging includes a resilient member fixedly disposed in said upright portion said resilient member urging said activating lever means against said locking means in said first position whereby said activating lever means is held in a frictional relationship with said locking means in said first position, said resilient member disposed as to said activating lever means, such that said resilient member enables said activating lever means to be urged thereagainst by the operator in said first position whereby said activating lever means and said locking means are disengaged.

7. The holder of claim 6 wherein said locking means comprises:
   a. an eccentric cam; and
   b. a substantially right angled lever having a first section rotatably mounted in said upright portion, said eccentric cam fixedly secured to the end of said first section; said eccentric cam disposed in relationship to said activating lever means, whereby when said locking means is rotated to said first position, said cam engages said activating lever means and urges said activating lever towards the position wherein said microphone is switched on, as said cam rotates.

8. The holder of claim 7 wherein said spring means stores energy as said locking means rotates to said first position, said stored energy returning said locking means to said second position upon said disengagement.

* * * * *